United States Patent [19]

Uchida et al.

[11] Patent Number: 4,816,844

[45] Date of Patent: Mar. 28, 1989

[54] SUPERIMPOSED IMAGE FORMING APPARATUS

[75] Inventors: Takashi Uchida, Kawasaki; Osamu Hoshino, Tokyo; Kazuyoshi Chiku, Tokyo; Yasushi Murayama, Tokyo; Kunihiko Matsuzawa, Kawasaki, all of Japan

[73] Assignee: Canon Kabushiki Kaisha, Tokyo, Japan

[21] Appl. No.: 81,974

[22] Filed: Aug. 5, 1987

[30] Foreign Application Priority Data

Aug. 8, 1986 [JP] Japan .................. 61-187457

[51] Int. Cl.⁴ .............................. G01D 15/00
[52] U.S. Cl. .................. 346/160; 346/157; 346/145; 242/57.1
[58] Field of Search ............ 226/15, 3, 180, 179, 226/191, 192; 242/57.1; 227/145, 148, 150, 119, 103; 346/100, 134, 136, 145, 146, 157, 160, 107 R, 108; 358/80

[56] References Cited

U.S. PATENT DOCUMENTS 4,485,982 12/1984 St. John et al. .................. 242/5.71
4,558,356 12/1985 Toda et al. ........................ 558/80

Primary Examiner—Arthur G. Evans
Attorney, Agent, or Firm—Fitzpatrick, Cella, Harper & Scinto

[57] ABSTRACT

A superimposed image forming apparatus, includes a plurality of electrophotographic photosensitive drums, toner image forming devices, provided for the respective photosensitive drums, for forming toner images on the respective photosensitive drums, image transfer devices, provided for the respective photosensitive drums, for transferring the toner images formed on the photosensitive drums onto a transfer material at respective image transfer stations, conveying devices for conveying the transfer material sequentially through the respective image transfer stations, and adjusting mechanisms for adjusting inclinations of rotational axes of the photosensitive drums. Thus, image inclination of a resultant image can be corrected by adjusting the inclination of the axis of the drum by an amount which is a half of the image inclination.

15 Claims, 8 Drawing Sheets

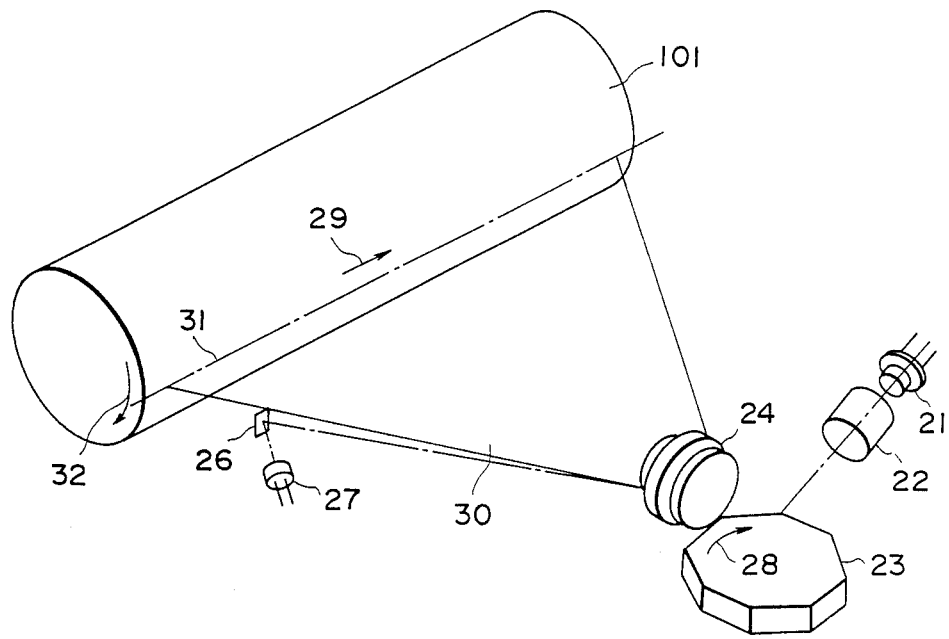
FIG. 4
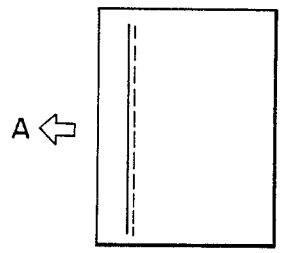 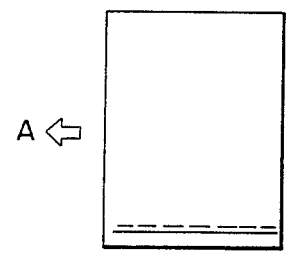 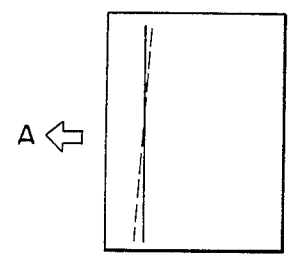
FIG. 5A    FIG. 5B    FIG. 5C

SUPERIMPOSED IMAGE FORMING APPARATUS

FIELD OF THE INVENTION AND RELATED ART

The present invention relates to a superimposed image forming apparatus for forming a superimposed image from image information using an electrophotographic process or the like, and more particularly to such a superimposed image forming apparatus in the form of a copying machine, facsimile machine, printer or the like including a plurality of image forming stations.

Various proposals have been made as to a multi-color or full-color image forming apparatus containing plural image forming stations in a single apparatus to transfer different color images onto one and the same transfer material, as disclosed in U.S. Pat. Nos. 3,690,756; 4,120,557; 4,162,843; 4,239,370; 4,371,253; 4,531,828; 4,66,077, and U.S. Ser. No. 521,832 filed on Aug. 10, 1983.

FIG. 3 illustrates one such apparatus. The shown apparatus is provided with image forming stations $1_M$, $1_C$, $1_Y$ and $1_{BK}$ for magenta, cyan, yellow and black, respectively. Each of the image forming stations 1hd M, $1_C$, $1_Y$ and $1_{BK}$ contains an image bearing member $101_M$, $101_C$, $101_Y$ or $101_{BK}$, developing device $102_M$, $102_C$, $102_Y$ or $102_{BK}$ as an image forming means and a cleaning device $104_M$, $104_C$, $104_Y$ or $104_{BK}$. Often, each of the image forming stations constitutes one image forming unit. For the respective image forming stations, image writing devices are disposed, such as laser optical systems $L_M$, $L_C$, $L_Y$ and $L_{BK}$.

In operation, an image bearing material S, such as a recording sheet, is fed out from a cassette C one at a time by a pick-up roller 2 and is once stopped by a couple of registration rollers 3, by which the recording material S is re-fed in timed relation with an image on the image bearing member. The recording material S is further advanced by conveying means 4 in the direction of an arrow A, while at the same time it receives images from the image forming stations, $1_M$, $1_C$, $1_Y$ and $1_{BK}$ in a superimposed manner. The recording material S now having superimposed images thereon is transported to an image fixing device 5, where the image thereon is fixed by pressure and/or heat. The recording material is subsequently discharged as an output print having an image.

An image formation using the laser optical system $L_M$, $L_C$, $L_Y$ and $L_{BK}$ is performed as shown in FIG. 4. A laser beam produced by a semiconductor laser 21 is converged to a collimated beam by a collimator lens 22 and is incident on a mirror surface of a polygonal mirror 23 which is rotating at a constant speed in a direction indicated by an arrow 28. The beam is reflected by the mirror surface and is deflected in a constant angular velocity. The beam is then transmitted through an $f-\theta$ lens 24 and is incident on the surface of the image bearing member 101 which is a photosensitive drum, so that the surface of the image bearing member 101 is scanned at a constant linear speed in the direction indicated by an arrow 29, thus forming a scanned line 31 on the surface of the photosensitive drum 25.

A beam detecting device is employed to detect the scanning beam 30. It comprises a reflection mirror 26 disposed at a predetermined position within the scanning range of the scanning beam 30 and a photodetector 27 for receiving the beam reflected by the reflecting mirror 26. The scanning beam 30 is received by the reflecting mirror 26 for each scan, and is received by the photodetector 27, which is positioned at a focal point of the $f-\theta$ lens 24. The photodetector 27 serves to determine the point of time at which the recording signal is applied. After a predetermined time delay, controlled by an unshown control circuit, from the reception of the laser beam by the photodetector 27, the production of the recording signal starts. In response to the signal, the semiconductor laser 21 generates a laser beam modulated in its intensity in accordance with the signal to be recorded by an unshown modulating circuit, so that, a latent image corresponding to the modulation is formed on the image bearing member 101 rotating in the direction of the arrow 32.

Thus, the scanning optical system of the conventional laser beam image forming apparatus is constituted by a laser functioning as a beam source, a polygonal mirror 23 for deflecting the laser beam produced thereby, the $f-\theta$ lens 24 for providing a constant linear velocity of the scanning beam on a generator line of the image bearing drum 101 and a beam detector 27 for detecting a predetermined position of the scanning beam.

Recently, it is one of the most important requirements that color images transferred at the respective image forming stations are correctly registered with each other. This is particularly important in the case of multi-color image formation and full-color image formation, since in the multicolor image formation a misregistration results in a gap or overlap between different color images; in the case of full-color image formation, different tinting or color misregistration results. They are, of course, unsatisfactory to the users.

SUMMARY OF THE INVENTION

Accordingly, it is a principal object of the present invention to provide a superimposed image forming apparatus wherein images are superimposed in correct registration.

It is another object of the present invention to provide a multi-color or full-color image forming apparatus wherein color separated images are sufficiently registered.

It is a further object of the present invention to provide a superimposed image forming apparatus which is substantially free from misregistration without using a particular driving control system or optical system.

According to an embodiment of the present invention, there is provided a superimposed image forming apparatus comprising plural electrophotographic photosensitive members disposed in parallel, toner image forming means provided for the respective photosensitive members and image transfer means provided for the respective photosensitive members. By the transfer means, the toner images are transferred from the respective photosensitive member by the associated transfer means onto one and the same transfer material. The embodiment is characterized by a mechanism for displaceably fixing a rotational axis of the photosensitive member.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 4 is a schematical perspective view illustrating a laser beam scanning system.

FIGS. 5A, 5B and 5C are top plan views illustrating examples of misregistration results on recording materials.

DESCRIPTION OF THE PREFERRED EMBODIMENTS

For a better understanding of the present invention, a description will first be made as to causes of the deviation and misregistration described in the foregoing.

Referring first to FIGS. 5A, 5B and 5C, there are shown examples of misregistration. In those Figures the solid line is a magenta color image, for example, while the broken line is another color image, cyan for example. The deviations are generally categorized into three deviations, i.e. a parallel deviation shown in FIG. 5A which is a deviation parallel with the direction indicated by an arrow A of transfer material conveyance by the conveying means 4, a perpendicular deviation as shown in FIG. 5B and an oblique deviation. In the actual image, those deviations are superimposed on the transfer material. The perpendicular deviation (FIG. 5A) is mainly attributable to a difference or differences in the time periods required for the transfer material to move between adjacent image forming stations $1_M$-$1_C$, $1_C$-$1_Y$ or $1_Y$-$1_{BK}$. Since such a difference results from the deviation in the image writing start timing, the parallel deviation can be corrected electrically, more particularly the timing of starting image writing action can be changed to remove the deviation.

One of the causes of the perpendicular deviation (FIG. 5B) is related to the photodetector 27 shown in FIG. 4, and the other relates to an inclination of a rotational axis of the image bearing member in a vertical plane. The former point is attributable to non-uniform time lag from the photodetector receiving the laser to the signal instructing start of image signals due to a positional deviation of the photodetector 27 or a change of the level of laser power resulting in sensing the level change of the photodetector 27. Those can be corrected by setting the time lag for each of the colors. The latter point will be described in detail in conjunction with FIG. 6.

Figure 3:
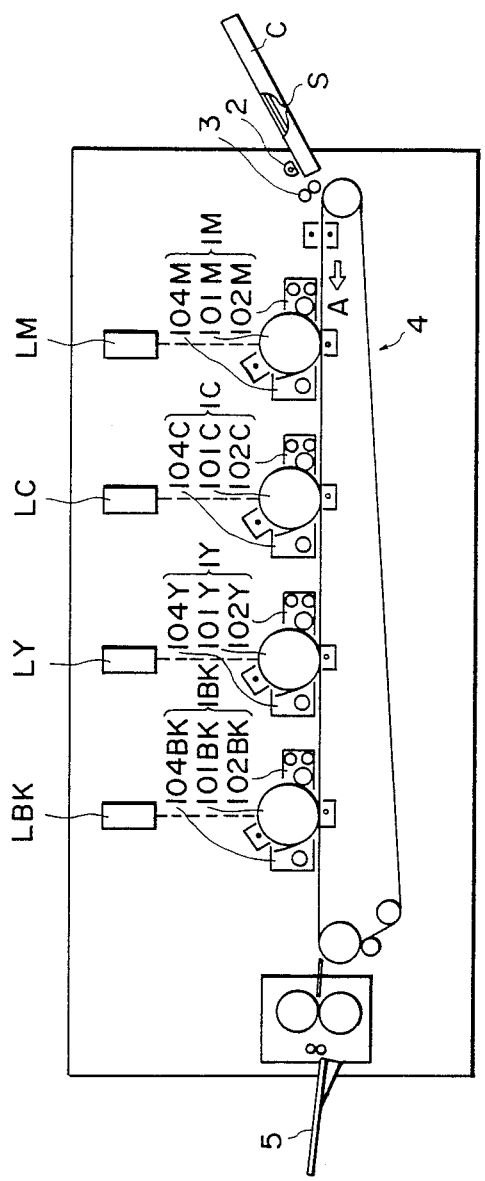
FIG. 3 is a sectional view of an example of conventional superimposed image forming machines.
Figure 6:
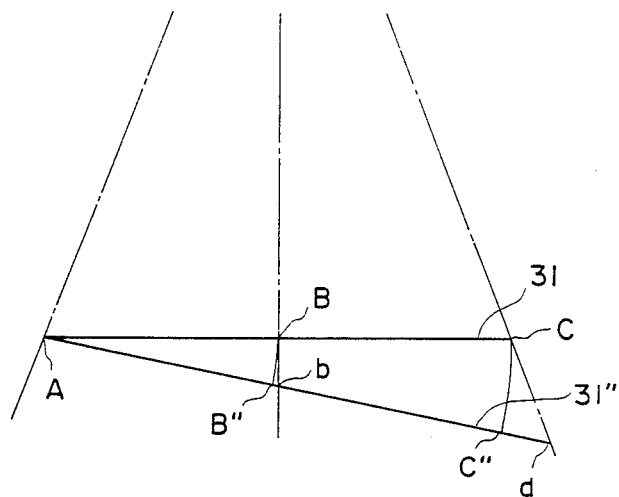
FIG. 6 illustrates the influence of an oblique arrangement of a photosensitive member.
Figure 7:
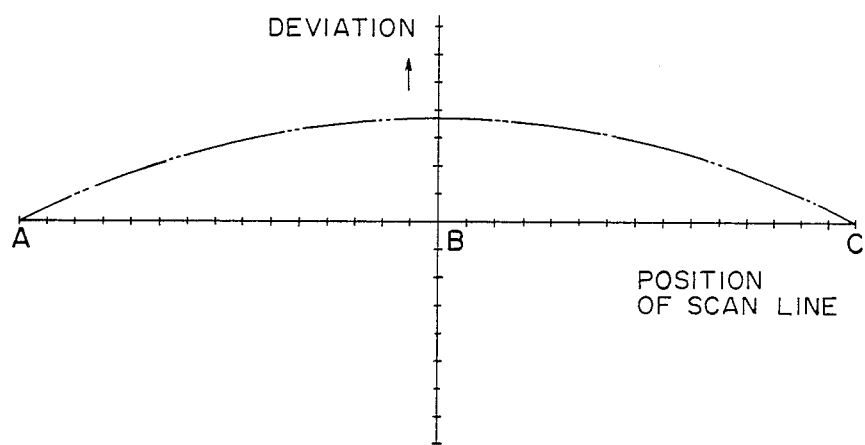
FIG. 7 is a graph showing distribution of deviation in a resulting image.

In FIG. 6, a scanning line is designated by a reference numeral 31, when the image bearing member is not oblique. Reference characters A and C indicate the ends of a line image provided by the scanning line 31, and B is the center of the line image, wherein the distance AB is, therefore, equal to the distance BC. If the rotational axis of the image bearing member is oblique, the scanning line corresponding to the scanning line 31 is inclined as indicated by a reference 31″ about an end A of the image, for example by an angle of $\theta$. As will be understood, the scanning lines 31 and 31″ are parallel with the respective drum axes. On the scanning line 31″, a point away from the end A of the image by the distance AB is indicated by B″, and a point away from the same end by the distance AC (=2×distance AB) is indicated by C″. As will be understood from this Figure, the image point to be written at B on the scanning line 31 is written at a point b on the scanning line 31″, and similarly, the image point to be written at C is written at a point d. Therefore, if the drum is adjusted so that the images are superposed at the end A, the image at the opposite end is deviated by a distance C″d. Also, at the center, the deviation B″b results. In an attempt to remove the deviation, the optical path length between the polygonal mirror and the photosensitive member may be changed, more particularly may be reduced so as to make the distance Ad to the distance AC. However, if this were done, another deviation as shown in FIG. 7 would result due to the fact that the ratio between the distance AB and the distance AC (1:2) is smaller than the ratio between the distance Ab and the distance Ad. If, in FIG. 3, only the image bearing member $101_M$ of the cyan image forming station is inclined, only the cyan transferred image is deviated for the reasons described with FIGS. 6 and 7. Conventionally, the position of the optical system is adjusted. However, the adjustment is very time-consuming and cumbersome. Additionally, the adjustment is required each time the image bearing member is exchanged. Therefore, the operativeness is not good.

The deviation shown in FIG. 5C is considered as being attributable in one case to non-parallelism between the scanning beams 30 provided by the laser optical systems, and in the other case to the rotational axes of the image bearing members being nonparallel, more particularly, inclined in a vertical plane. Both can occur simultaneously. The deviations are shown in FIGS. 8A, 8B, 8C and 9.

In FIG. 8, the rotational axes of the image bearing members $101_M$, $101_C$, $101_Y$ and $101_{BK}$ are all parallel. On the other hand, the scanning lines for magenta image, yellow image and black image $31_H$, $31_Y$ and $31_{BK}$ are all parallel, but the scanning line $31_C$ for the cyan image is inclined from the parallel scanning lines by an angle $\theta$. The transfer material S is conveyed in a direction indicated by an arrow A.

Figure 8A:
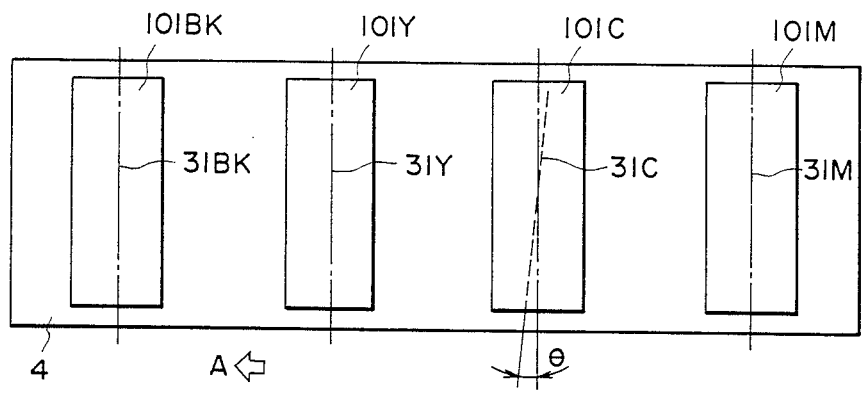
FIGS. 8A, 8B and 8C show deviations of an image resulting from inclination of a scanning line.
Figure 8B:
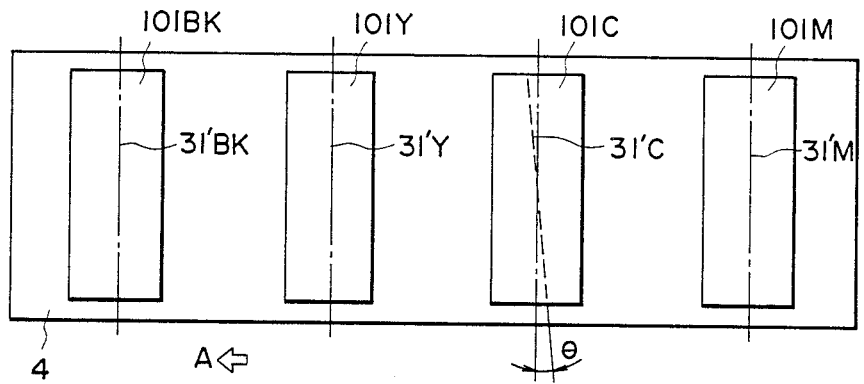

FIG. 8A shows the state immediately after latent images are formed by the scanning lines on the image bearing members. Although there exist time differences among the points of time at which the images are formed on the image bearing members $101_M$, $101_C$, $101_Y$ and $101_{BK}$ because the transfer material S is conveyed sequentially through the image forming stations, FIG. 8A shows the state when they are stopped immediately after the image is formed thereon, respectively. After the image formation the image bearing member rotates through 180 degrees from the position shown in FIG. 8A, assuming that the transfer station is 180 degrees away from the image forming station. Between the image forming station and the transfer station for each of the image bearing members, there is a developing station containing the developing device $102_M$, $102_C$, $102_Y$ or $102_{BK}$ by which each of the images are developed as a developed image $31'_M$, $31'_C$, $31'_Y$ or $31'_{BK}$ as shown in FIG. 8B, although the images are already positioned at the transfer station. As will be understood, the image $31'_C$ is inclined by the same angle $\theta$ but in the opposite direction with respect to the written latent image. On the transfer sheet S having received those images, only the cyan image appears inclined by the angle $\theta$ in the direction shown in FIG. 8B, so that in the resultant image, only the cyan image is inclined as shown in FIG. 8C.

Figure 8C:
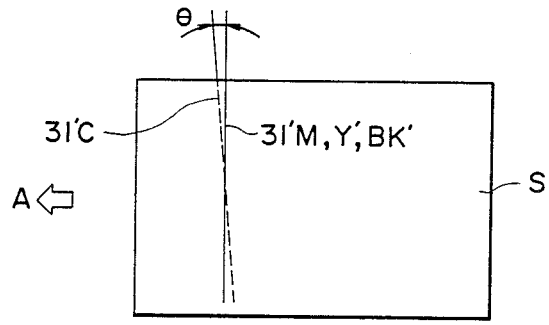
Figure 9A:
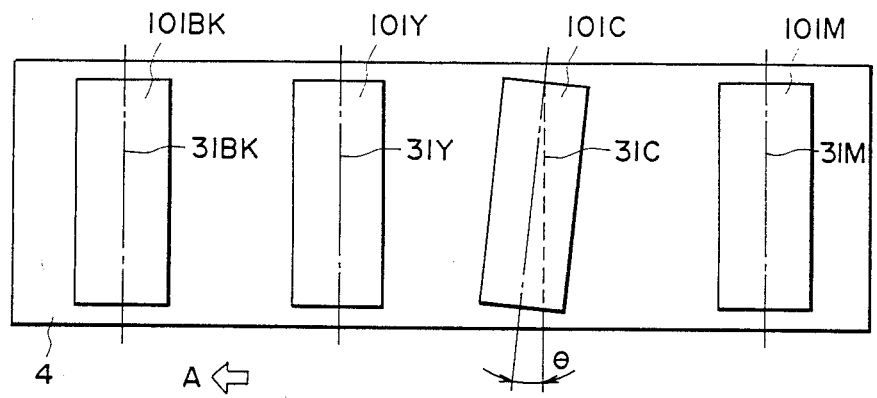
FIGS. 9A, 9B and 9C show deviations of an image resulting from inclination of a rotational axis of an image bearing member.
Figure 9B:
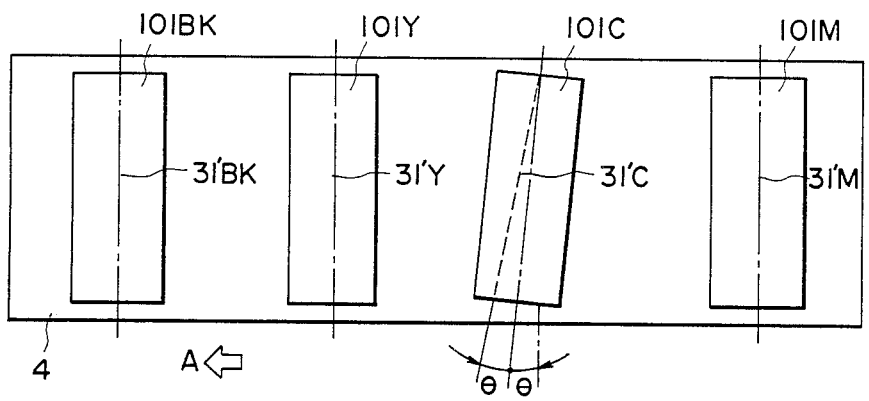
Figure 9C:
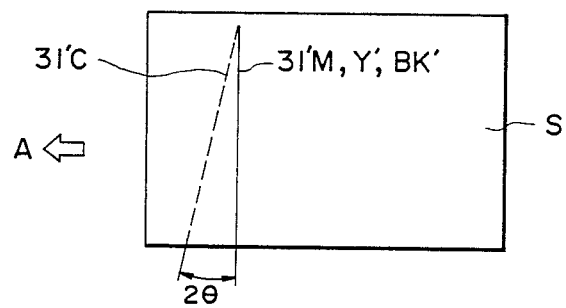

In FIG. 9, the scanning lines $31_M$, $31_C$, $31_Y$ and $31_{BK}$ are parallel as contrasted to the case of FIG. 8. However, only the image bearing member $101_C$ for the cyan image formation has a rotational axis inclined by an angle $\theta$ from the rotational axes of the other image bearing members which are all parallel. The transfer material S is conveyed in the detection A. FIG. 9A shows the latent images immediately after it is formed similarly to FIG. 8A; FIG. 9B shows the developed images immediately before they are transferred onto the transfer material S similarly to FIG. 8B; and FIG. 9C illustrates the deviation appearing on the image similarly to FIG. 8C.

In FIG. 9A, a bearing element for determining a front end position of the rotational axis of the image bearing member $101_C$ (bottom side in FIG. 9A) is offset so that the rotational axis is inclined by an angle $\theta$ from a predetermined position. As will be understood, the inclination of the deviated image is doubled, that is, $2\theta$ in the resultant image on the transfer material S. Thus, the deviation is aggravated. As will be understood from the foregoing analysis, when a comparison is made between the case of the scanning line inclination (FIG. 8A) and the case of the inclination of the image bearing member rotational axis (FIGS. 6A and 9), the influence of the inclination is not the same, more particularly, the influence is larger when the rotational axis is inclined than when the scanning line is inclined. The inclination of the scanning line can be corrected by using suitable tools and jigs, and what is more is that re-adjustment is not required after it is once adjusted correctly. On the contrary, the image bearing member is more frequently exchanged, and upon the exchange, the bearing member at the front side is usually taken out because there is a driving mechanism for the image bearing member at the rear side. Therefore, the positioning accuracy at the front side may be more easily and more frequently deteriorated, with the result of the inclination illustrated with FIGS. 6 and 9A.

Particularly when the image forming stations $1_M$, $1_C$, $1_Y$ and $1_{BK}$ are constituted as respective units, the rotational axis of the image bearing member is positioned within the unit, an thereafter the unit is positioned with respect to the image forming apparatus. For this reason, high positioning accuracy is required in the positioning of the rotational axis within the unit and also in the image forming apparatus. It is extremely difficult to provide satisfactory parallelism among the rotational axes of the image bearing members when one or more units are changed. Therefore, it is not possible to practically and effectively prevent the deviation shown in FIGS. 6 and 9C. Therefore, a need exists for practical means for preventing the deviation.

Figure 1A:
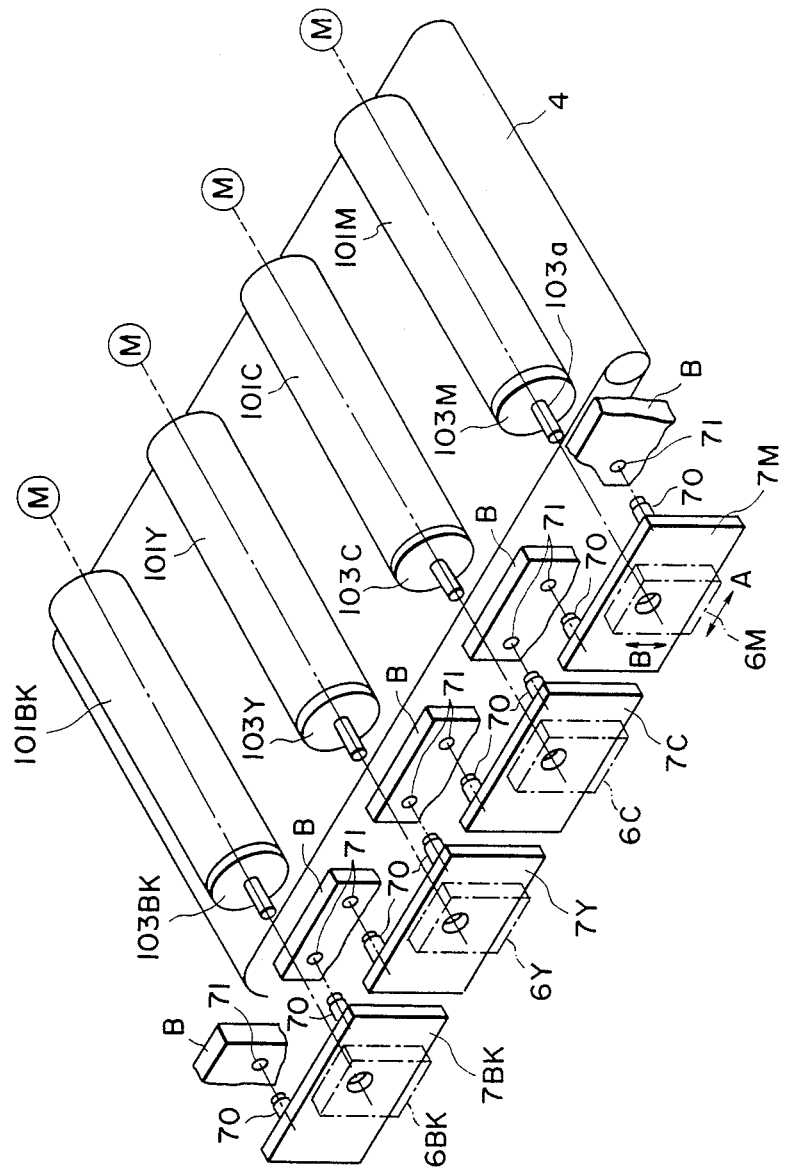
FIG. 1A is a perspective view illustrating a general arrangement of a superimposed image forming apparatus according to an embodiment of the present invention.

Referring now to FIG. 1A, there is shown a superimposed image forming apparatus according to an embodiment of the present invention. The apparatus comprises photosensitive drums $101_M$, $101_C$, $101_Y$ and $101_{BK}$ for magenta, cyan, yellow and black image formation, respectively, a transfer material conveying means 4. To the image bearing members flanges $103_M$, $103_C$, $103_Y$ and $103_{BK}$ are fixed at a front side end thereof. Each of the flanges has a shaft extending therefrom at the center thereof, which is journalled into a corresponding bearing $6_M$, $6_C$, $6_Y$ and $6_{BK}$ which will be described in more detail hereinafter. The bearings $6_M$, $6_C$, $6_Y$ and $6_{BK}$ are fixed to supporting members $7_M$, $7_C$, $7_Y$ and $7_{BK}$ corresponding to the respective image bearing members. The image bearing members are engaged at the opposite sides, i.e. rear sides with an unshown drive transmitting mechanism which is operatively coupled to the respective driving sources M. In the shown example, the driving sources M are provided for the respective image bearing members, but a single driving source may be used commonly for all the image bearing members. The supporting members $7_M$–$7_{BK}$ are mounted to the main frame by pins 70, for example.

Figure 1B:
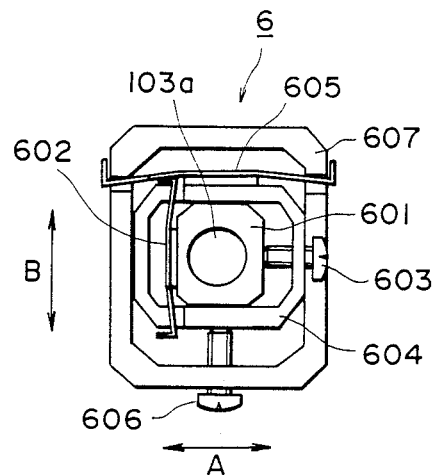
FIGS. 1B and 1C are a side view and a perspective view of a bearing used in the FIG. 1A apparatus.
Figure 1C:
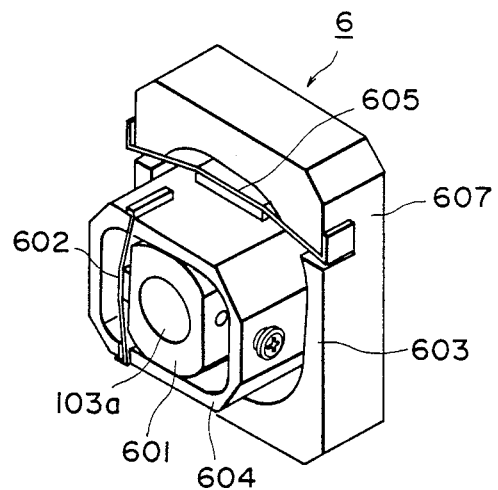

FIG. 1B shows the structure of the bearing 6 in greater detail. The shaft 103A of each of the flanges 103A is received by a bearing member 601. The bearing member 601 is supported in an inside case 604 for movement in a direction indicated by an arrow A along a guiding groove not shown. The inside case 604 is spring biased against an adjusting screw 603 by a leaf spring 602. The inside case 604 itself is supported in an outside case 607 for movement in a direction indicated by an arrow B which is perpendicular to the direction B along an unshown guiding groove. The inside case is spring-biased by a leafspring 605 against an adjusting screw 606.

The bearing 6 is mounted to the main frame of the image forming apparatus in the manner that the direction A and the direction B coincide with the horizontal and vertical directions, respectively. As will be understood from the foregoing explanation, the image deviation discussed with FIG. 9 can be corrected by an adjustment in the direction A, and the deviation of FIG. 7 can be corrected by the adjustment in the direction B.

In this embodiment, the adjusting screw 606 is M3 (JIS) with a pitch of 0.5 mm, so that one fifth turn of the screw corresponds to a positional displacement of as small as 0.1 mm, and therefore, satisfactory correction of image deviation can be effected.

Figure 2A:
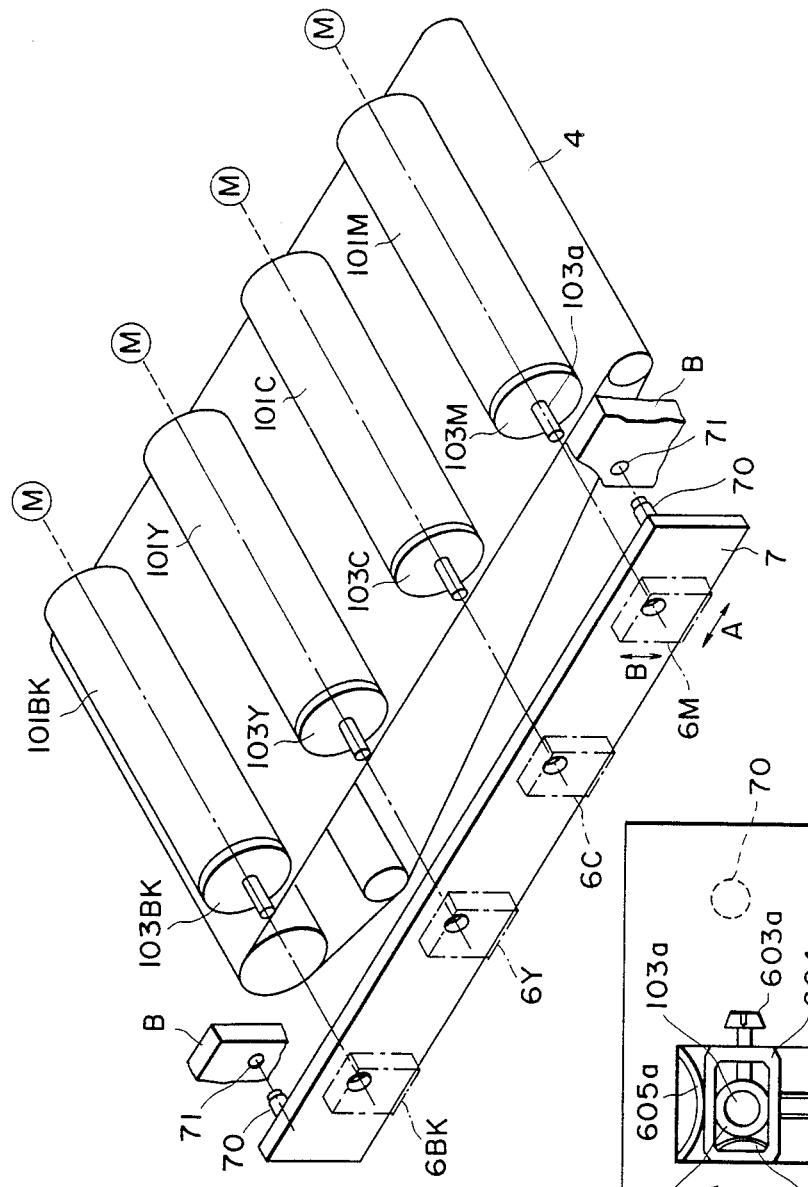
FIG. 2A is a perspective view of an apparatus according to another embodiment of the present invention.

FIG. 2A shows another embodiment, wherein the supporting members $7_M$–$7_{BK}$ of FIG. 1A are constituted into one integral supporting member 7. According to this embodiment, it is easy to dispose the bearings $6_M$–$6_{BK}$ at regular intervals, whereby the amount of adjustment in the direction A is reduced.

Figure 2B:
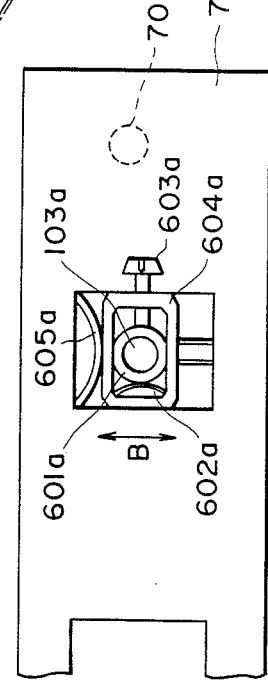
FIG. 2B is a side view of a shaft supporting member used in the FIG. 2A apparatus.

FIG. 2B shows a further embodiment, wherein one integral outside case 607 is employed in common for all of the image bearing members. In the outside case 607, the inside cases 604a are mounted for the respective image bearing members. A leaf-spring 605a similar to the foregoing spring normally urges the inside case 604a downwardly against an adjusting screw 606a. By rotating the screw 606a, the inside case 604a is moved in the vertical direction to correctly position the bearing member 601a. Another leaf spring 602a normally urges the bearing member in a horizontal direction against an adjusting screw 603a.

In the foregoing embodiments, the inclination adjusting operation can be performed in the following manner. First, one of the drum is adjusted and this is taken as a reference drum. Then, an image is actually formed on a transfer material. The inclination is checked on the resultant image with respect to the image from the reference drum. If deviation or deviations are found for one or more of the photosensitive members, the bearing for the photosensitive member or members are adjusted by the adjusting screw or screws.

As described in the foregoing according to the present invention, the image deviation on the transfer material can be minimized without adjusting the optical system and by a simple method.

The present invention is effectively applicable to a superimposed color image forming apparatus having a slit exposure type image exposure station. However, the present invention is most effectively applicable to an apparatus using a digital illumination source, since the digital illumination source, such as a laser source or an array of LED elements or the like, forms a scanning line having a width of several tens of microns, so that the above-described inclination are more remarkable on the resultant image.

While the invention has been described with reference to the structures disclosed herein, it is not confined to the details set forth and this application is intended to cover such modifications or changes as may come within the purposes of the improvements or the scope of the following claims.

What is claimed is:

1. A superimposed image forming apparatus comprising:

A plurality of electrophotographic photosensitive drums:

image forming means, provided for the respective photosensitive drums, for forming images on the respective photosensitive drums, said image forming means including:

means for forming on said respective photosensitive drums latent images by scanning beams deflected along respective scanning lines and modulated in accordance recording signals; and means for producing toner images from the latent images;

image transfer means, provided for the respective photosensitive drums, for transferring the toner images formed on said photosensitive drums onto a transfer material at respective image transfer stations;

conveying means for conveying the transfer material sequentially through the respective image transfer stations; and adjusting means for adjusting the inclinations of the rotational axes of said photosensitive drums, to transfer the toner images onto the transfer material at the respective image transfer stations with the scanning lines aligned on the transfer material.

2. A superimposed image forming apparatus comprising:

a plurality of electrophotographic photosensitive drums;

image forming means, provided for the respective photosensitive drums, for forming images on the respective photosensitive drums, said image forming means including:

means for forming on said respective photosensitive drums latent images by scanning beams deflected along respective scanning lines and modulated in accordance with recording signals;

and means for producing toner images from the latent images;

image transfer means, provided for the respective photosensitive drums, for transferring the toner images formed on said photosensitive drums onto a transfer material at respective image transfer stations, conveying means for conveying the transfer material sequentially through the respective image transfer stations; and adjusting means for adjusting the inclinations of the rotational axes of said photosensitive drums, to transfer the toner images onto the transfer material at the respective image transfer stations with the scanning lines aligned on the transfer material, wherein said adjusting means is capable of displacing one side end of the rotational axes of said photosensitive drums.

3. An apparatus according to claim 2, wherein said adjusting means includes a bearing for supporting a shaft of one of said photosensitive drum, inside guide means for allowing movement of said bearing in a first direction and outside guide means for allowing movement of said inside guide means in a second direction perpendicular to the first direction.

4. A superimposed image forming apparatus, comprising:

a plurality of electrophotographic photosensitive drums;

image forming means, provided for the respective photosensitive drums, for forming images on the respective photosensitive drums, said image forming means including:

means for forming on said respective photosensitive drums latent images by scanning beams deflected along respective scanning lines and modulated in accordance with recording signals; and means for producing toner images from the latent images;

image transfer means, provided for the respective photosensitive drums, for transferring the toner images formed on said photosensitive drums onto a transfer material at respective image transfer stations;

conveying means for conveying the transfer material sequentially through the respective image transfer stations; and adjusting means for adjusting the inclination of a rotational axis of one of said photosensitive drums by displacing an element in the neighborhood of a shaft of said photosensitive drum in a first direction and a second direction perpendicular to the first direction, to transfer the toner images onto the transfer material at the respective image transfer stations with the scanning lines aligned on the transfer material, said adjusting means including supporting means, common for said plurality of photosensitive drums, for supporting the shafts of said photosensitive drums.

5. An apparatus according to claim 4, wherein said adjusting means includes bearings for supporting the shafts of the respective photosensitive drums and inside guides supported, for movement in a first direction, in openings formed in said common supporting means, said inside guides each supporting one of the bearings for movement in a second direction perpendicular to the first direction.

6. An apparatus according to claim 1, wherein said latent image forming means includes a digital optical system.

7. An apparatus according to claim 2, wherein said latent image forming means includes a digital optical system.

8. An apparatus according to claim 4, wherein said latent image forming means includes a digital optical system.

9. An apparatus according to claim 7, wherein said digital optical system includes a laser beam source.

10. An apparatus according to claim 8, wherein said digital optical system includes a laser beam source.

11. An apparatus according to claim 6, wherein said digital optical system includes a laser beam source.

12. An apparatus according to claim 1, wherein said toner image producing means includes respective toners having different colors, and wherein said apparatus forms a color image on the transfer material.

13. An apparatus according to claim 2, wherein said toner image producing means includes respective toners having different colors, and wherein said apparatus forms a color image on the transfer material.

14. An apparatus according to claim 4, wherein said toner image producing means includes respective toners having different colors, and wherein said apparatus forms a color image on the transfer material.

15. An apparatus according to claim 1, wherein said adjusting means includes:
- a bearing for supporting a shaft of one of said photosensitive drums;
- inside guide means for allowing movement of said bearing in a first direction; and
- outside guide means for allowing movement of said inside guide means in a second direction perpendicular to the first direction.

* * * * *

UNITED STATES PATENT AND TRADEMARK OFFICE
CERTIFICATE OF CORRECTION

PATENT NO. : 4,816,844

DATED : March 28, 1989

INVENTOR(S) : Takashi Uchida, et al.

It is certified that error appears in the above-identified patent and that said Letters Patent is hereby corrected as shown below:

COLUMN 1:

Line 25, "image forming stations 1hd M," should read --image forming stations $1_M$,--.

Line 46, "thereon" should be deleted.

COLUMN 2:

Line 58, "member" should read --members--.

COLUMN 3:

Line 47, "perpendicular" should read --parallel--.

COLUMN 4:

Line 52, "$31_H$," should read --$31_M$,--.

COLUMN 5:

Line 22, "detection A." should read --direction A.--.

Line 58, "an" should read --and--.

UNITED STATES PATENT AND TRADEMARK OFFICE
CERTIFICATE OF CORRECTION

PATENT NO. : 4,816,844

DATED : March 28, 1989

INVENTOR(S) : Takashi Uchida, et al.

It is certified that error appears in the above-identified patent and that said Letters Patent is hereby corrected as shown below:

COLUMN 6:

Line 26, "103A" should read --$103_{M-BK}$--.

Line 33, "direction B" should read --direction A--.

COLUMN 7:

Line 3, "drum" should read --drums--.

Line 8, "bearing" should read --bearings--.

Line 23, "inclination" should read --inclinations--.

Line 34, "A" should read --a--.

Line 43, "accordance recording" should read --accordance with recording--.

UNITED STATES PATENT AND TRADEMARK OFFICE
CERTIFICATE OF CORRECTION

PATENT NO. : 4,816,844

DATED : March 28, 1989

INVENTOR(S) : Takashi Uchida, et al.

It is certified that error appears in the above-identified patent and that said Letters Patent is hereby corrected as shown below:

COLUMN 8:

Line 23, "said photosensitive drum," should read -- said photosensitive drums, --.

Signed and Sealed this

Sixteenth Day of January, 1990

*Attest:*

JEFFREY M. SAMUELS

*Attesting Officer*     *Acting Commissioner of Patents and Trademarks*